United States Patent
Zysman et al.

(10) Patent No.: US 6,487,848 B2
(45) Date of Patent: Dec. 3, 2002

(54) GAS TURBINE ENGINE JET NOISE SUPPRESSOR

(75) Inventors: Steven H. Zysman, Hebron, CT (US); Wesley K. Lord, South Glastonbury, CT (US); Gregory A. Kohlenberg, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/187,592

(22) Filed: Nov. 6, 1998

(65) Prior Publication Data

US 2002/0121090 A1 Sep. 5, 2002

(51) Int. Cl.$^7$ ............................. F02K 1/38; B63H 11/10
(52) U.S. Cl. .................................... 60/262; 239/265.19
(58) Field of Search .......................... 60/262, 226.1, 60/271, 39.5; 239/265.17, 265.19; 181/213

(56) References Cited

U.S. PATENT DOCUMENTS

| | | | |
|---|---|---|---|
| 3,153,319 A | * 10/1964 | Young et al. | 239/265.19 |
| 3,351,155 A | 11/1967 | Hoch et al. | 181/51 |
| 3,982,696 A | 9/1976 | Gordon | 239/265.17 |
| 4,284,170 A | * 8/1981 | Larson et al. | 181/213 |
| 4,298,089 A | 11/1981 | Birch et al. | 181/213 |
| 4,401,269 A | 8/1983 | Eiler | 239/265.17 |
| 4,487,017 A | 12/1984 | Rodgers | 60/262 |
| 4,543,784 A | 10/1985 | Kirker | 60/262 |
| 4,592,201 A | 6/1986 | Dusa et al. | 60/262 |
| 4,754,924 A | 7/1988 | Shannon | 239/127.3 |
| 4,929,088 A | 5/1990 | Smith | 366/337 |
| 4,981,368 A | * 1/1991 | Smith | 366/337 |
| 5,222,359 A | 6/1993 | Klees et al. | 60/204 |
| 5,269,139 A | 12/1993 | Klees | 60/262 |
| 5,638,675 A | 6/1997 | Zysman et al. | 60/262 |
| 5,755,092 A | 5/1998 | Dessale et al. | 60/262 |
| 5,761,900 A | 6/1998 | Presz, Jr. | 60/262 |
| 5,771,681 A | * 6/1998 | Rudolph | 60/262 |
| 5,775,095 A | 7/1998 | Zysman et al. | 60/204 |
| 6,360,528 B1 | 3/2002 | Brausch et al. | 60/262 |

FOREIGN PATENT DOCUMENTS

| | | | |
|---|---|---|---|
| GB | 2207468 A | * 2/1989 | 60/262 |
| GB | 2 289 921 | 12/1995 | |

OTHER PUBLICATIONS

AIAA–95–2146, "Analysis of Flowfield from a Rectangular Nozzle with Delta Tabs", C. J. Steffen, Jr.; D. R. Reddy and K. B. M. Q. Zaman, Internal Fluid Mechanics Division, NASA Lewis Research Center, Cleveland, Ohio, 26$^{th}$ AIAA Fluid Dynamics Conference, Jun. 19–22, 1995; San Diego, CA, pp. 1–14.

"The distortion of a jet by tabs", by L. J. S. bradbury and A. H. Khadem, Mechanical Engineering Department, University of Surrey, Guildford, England, J. Fluid Mech (1975), vol. 70, part 4, pp. 801–813.

* cited by examiner

*Primary Examiner*—Charles G. Freay
*Assistant Examiner*—Michael K. Gray
(74) *Attorney, Agent, or Firm*—Monica G. Krasinski; Brian J. Hamilla

(57) ABSTRACT

The present invention relates to a gas turbine engine jet noise suppressor which does not appreciably adversely impact engine thrust and performance. The jet noise suppressor includes a nozzle, having an arrangement thereon of tabs disposed on the downstream end of the nozzle, the tabs having a length and the angular offset with respect to the engine flow such that mixing occurs primarily at the interface of the engine flow and the ambient air. In addition, various construction details are developed for the tabs including tabs that are trapezoidal with tapered sides such that the tabs minimize adverse impact to engine performance.

22 Claims, 1 Drawing Sheet

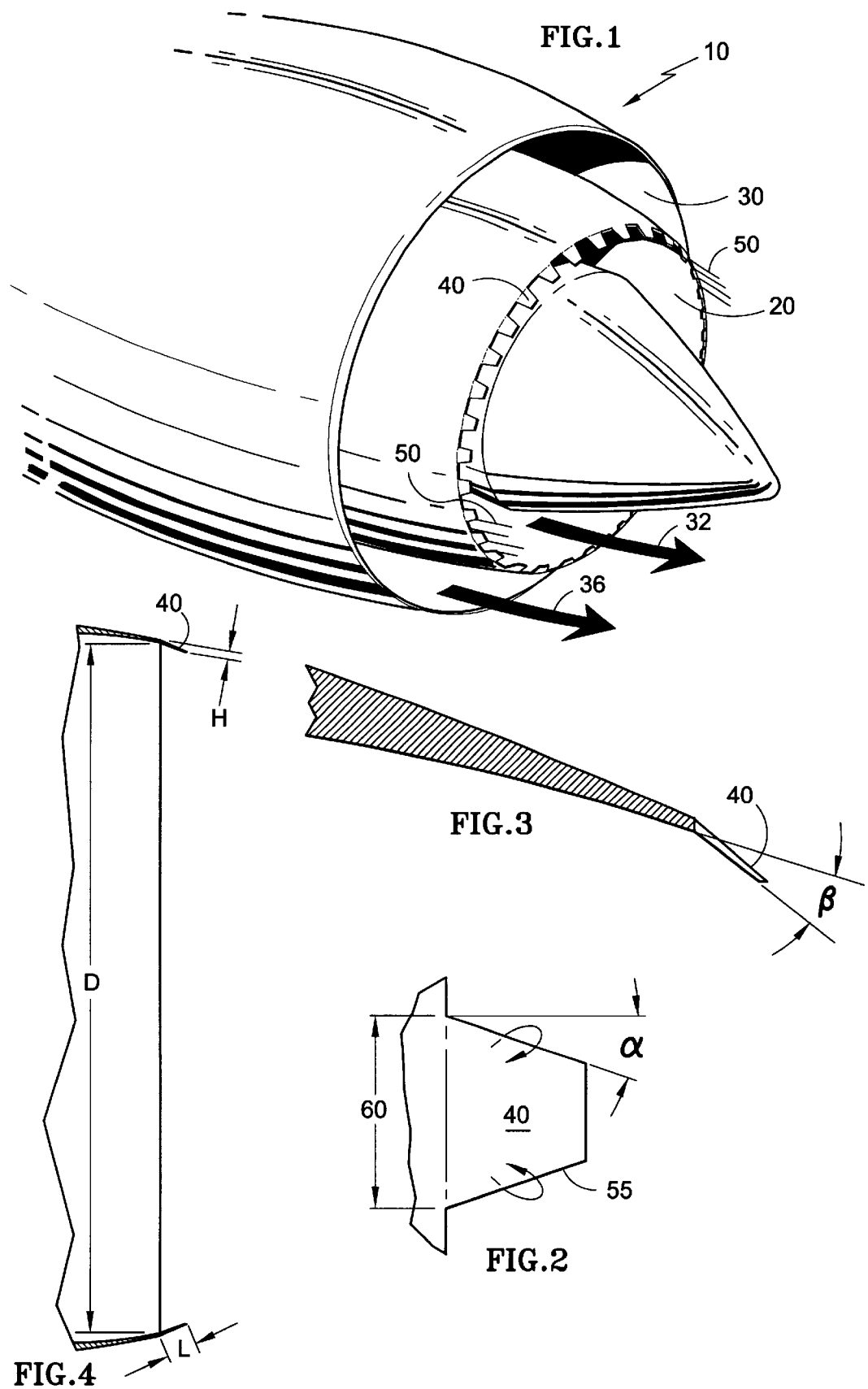

GAS TURBINE ENGINE JET NOISE SUPPRESSOR

TECHNICAL FIELD

This invention relates to gas turbine engine nozzles, and more particularly to nozzle constructions for jet noise suppression.

BACKGROUND ART

Jet noise is created by the turbulent mixing of high velocity engine gases that emanate from the downstream end of a modern gas turbine. The turbulent mixing occurs between the high velocity gases and between the high velocity gases and ambient flow. The high velocity exhaust gases are typically a mixture of two sources—the hot gases resulting from the combustion within the engine core flow (primary source) and cooler air discharged from fan bypass ducts (secondary source). The velocity of the core flow is on the order of 1600 ft/sec, while the velocity of the fan bypass flow is on the order of 1000 ft/sec. The velocity gradient that exists at the different interfaces or shear regions, namely between the core and the fan exhaust flows, between the fan exhaust flow and ambient, and between the core flow and ambient, results in flow disturbances. These flow disturbances or turbulence results in jet noise. The turbulent flow in the shear regions between the high velocity gases and the ambient air produce a significant component of the high levels of noise that are objectionable for aircraft operation from commercial airports.

Due to the adverse impact noise has on the environment, many countries and airports have imposed increasingly strict noise reduction criteria on aircraft. In the United States, the Federal Aviation Administration (FM) has imposed strict noise reduction limits on aircraft that are currently in use. In addition, the restrictions imposed by various airports range from financial penalties and schedule restrictions to an outright ban on the use of the aircraft. An effective and efficient noise reduction solution is necessary since these restrictions would severely cut short the useful life for certain types of aircraft that commercial airlines are currently using.

Turbofan engines are categorized as either low bypass ratio or high bypass ratio, based on the ratio of bypass flow to core flow. Jet noise is a well-known problem with low bypass ratio engines. In the low bypass ratio jet engines, the exhaust gases emanating from the core and fan bypass ducts usually mix before they exit the engine's exhaust nozzle, where they form a high speed plume. The plume rips or shears against the slower ambient air as it rushes by creating flow turbulence and thus jet noise.

Typically, newer jet engines are high bypass ratio engines which have lower (but still significant) levels of jet noise than low bypass ratio engines. High bypass ratio engines usually have separate-flow exhaust systems. High bypass ratio engines have much larger fan flows, and overall larger total engine flow rates than the low bypass ratio engines. Thrust is obtained through larger mass flow rates, and lower jet velocities than low bypass ratio engines. Due to lower jet velocities, the level of jet noise is decreased in these high bypass ratio engines as compared to the low bypass ratio engines.

However, jet noise remains a problem for modern high bypass ratio engines especially during operation at high engine power levels. High engine power is typically associated with aircraft take-off scenarios when the engine produces a high thrust and results in high velocity exhaust air. The FAA imposes strict noise requirements at high power. Modern, high bypass ratio engines have to comply with the requirement to provide ever-higher thrusts to power new and growth versions of aircraft with increasing takeoff gross weight. As a result, the modern, high bypass ratio engines operate at higher jet temperatures and pressure ratios and generate higher jet velocities and thus higher jet noise levels than earlier models of high bypass ratio engines.

In the prior art of jet noise suppression, different structures have been devised to reduce noise. For example, a lobed mixer concept has been used in the past for the low bypass ratio engines which have a long duct, common flow exhaust system such as those used in Pratt & Whitney's JT8D engine family.

Examples of such noise suppression structures are found in U.S. Pat. No. 4,401,269 to Eiler and U.S. Pat. No. 5,638,675 to Zysman et al, both assigned to the assignee of the present application, which disclose lobed mixers for a gas turbine engine. The lobed mixer includes axially and radially extending chutes. The chutes act as gas conduits whereby relatively cool, low velocity fan air is directed into the chutes and in turn into the hot, higher velocity core gas flow. The lobed mixer thus increases the mixing of the core and fan bypass gases.

While the long duct, common flow exhaust systems of the prior art, as represented by the exhaust nozzles of the JT8D engine family, and the '269 and '675 patents, have met with great commercial acceptance in the aerospace industry, the assignees of the present invention are constantly looking to improve the exhaust nozzle system of gas turbine engines, especially during operation of the engines at high power levels. Studies and nozzle configurations including tab concepts have been proposed to achieve mixing.

Even though tabbed mixing devices are generally known, these devices have been unsuitable for jet engine applications. Typically, tabs disposed in fluid flow streams are known to increase noise because the tabs provide cross-stream mixing over a wide flow area within the entire fluid flow stream. The tabs create pairs of oppositely rotating vortices, which in turn generate noise.

Further, not only would typical tabbed mixing devices adversely impact jet noise, they would also adversely impact engine thrust or performance. The angular orientation of the tabs would introduce unacceptable thrust losses due to the high degree of penetration of typical tabs into the fluid flow stream. The tabs would extract useful energy from the flow stream and would cause a significant thrust loss to the engine.

DISCLOSURE OF THE INVENTION

A primary object of the present invention is the provision of enhanced jet noise suppression, especially during engine operation at high power levels.

A further object of the present invention is the provision of enhanced jet noise suppression without the addition of appreciable thrust losses.

Another object of the present invention is the provision of a jet noise suppression system, which does not increase high frequency noise.

Another object of the present invention is the provision of a jet noise suppression system that minimizes the addition of weight.

According to the present invention, a gas turbine engine jet noise suppressor which does not appreciably adversely impact engine thrust and performance includes two concentric nozzles with associated flow streams and an arrangement of nozzle tabs disposed in at least one of the nozzles, that are directed and extend in a radially inward direction for increasing the effectiveness of the mixing process at the interface between exhaust gas flow streams and the ambient air. The nozzle tabs are trapezoidal in shape and are disposed circumferentially at the exit of an exhaust nozzle. In a preferred embodiment of the present invention, each tab is spaced apart from adjacent tabs and is directed radially inwardly into the exhaust nozzle with a predetermined angular relationship with respect to the flow stream.

The present invention suppresses jet noise with minimal impact to engine thrust and performance. The tabs of the present invention have relatively small angles of protrusion into the engine flow. The tabs are angled inwardly only a small amount, with angles ranging between 5 to 15°, commensurate with the interface between the core and fan flow streams which spans a relatively small radial distance. The present invention creates vortices or swirling motion at the interface between the distinguishable flow streams of the exhaust nozzles and ambient air. These vortices pull the flow at the interface of the core and fan flow streams into mixing engagement. The vortices however do not appreciably adversely impact engine thrust and performance as they are small, acting primarily on the narrow interface flow area between the engine flow streams. The interface mixing provided by the present invention shortens the effective length of the jet plume thereby reducing noise generation in the nozzle.

Further, the present invention has only a minimal impact on the weight of the gas turbine engine because the tabs are relatively small as compared to the diameter of the nozzle. In a preferred embodiment, the ratio of the length of the tabs to the diameter of the nozzle is approximately 0.04. In addition, the ratio of the height of the tab protruding into the flow stream to the diameter of the nozzle is approximately 0.006. The height and number of tabs is a function of nozzle geometry.

The foregoing and other objects, features and advantages of the present invention will become more apparent in the following detailed description of the best mode for carrying out the invention and from the accompanying drawings that illustrate an embodiment of the invention.

BRIEF DESCRIPTION OF THE DRAWINGS

FIG. 1 is a perspective view of the downstream end of a gas turbine engine showing a view of a tabbed exhaust nozzle system of the present invention;

FIG. 2 is an enlarged view of the nozzle tab of the present invention;

FIG. 3 is a sectional view taken along the line 3—3 of FIG. 1; and

FIG. 4 is a diagrammatic view of the tabbed core nozzle in the nozzle system of the present invention.

BEST MODE FOR CARRYING OUT THE INVENTION

Referring to FIG. 1, in a typical turbofan engine 10, having a longitudinally extending central axis, air enters the upstream end of the engine. As is well known in the art and, therefore, not illustrated herein, as air enters the front of the jet engine it passes through the fan and is split between a primary or core flow and a secondary or bypass flow. The primary flow first enters a low pressure compressor, and then a high pressure compressor. The air is then mixed with fuel in a combustion chamber and the mixture is ignited and burned, thereby increasing its temperature. The resultant combustion products then flow into a high pressure turbine and a low pressure turbine which extract energy from the combustion gases to turn the fan and compressor. The gases then expand through an inner (core) exhaust nozzle 20 to produce useful thrust. The bypass stream is compressed by the fan, flows outside the core of the engine through an annular duct concentric with the core engine and is exhausted through an outer (fan) exhaust nozzle 30 as additional useful thrust. The two concentric flow streams (engine core exhaust 32 and surrounding fan discharge airflow 36) join downstream of the turbine exhaust area of the engine. The two flows then mix together and with the surrounding ambient flow as described hereinafter.

The jet noise suppressor of the present invention includes an arrangement of nozzle tabs 40, each projecting radially inwardly with respect to the core flow stream and extending into the flow stream emanating from the core exhaust nozzle. The tabs are disposed along the entire circumference of the downstream end of the core nozzle.

Referring to FIGS. 2 and 3, the major surface of the tabs 40 is generally trapezoidal with a base integral with the nozzle, and a truncated downstream edge. The sides of the trapezoidal tabs are tapered at an angle $\alpha$ that may range from 5 to 15° from the longitudinal. In the preferred embodiment, this angle is ten degrees (10°).

The tabs of the jet noise suppressor of the present invention minimize thrust losses of the engine. As described heretofore, the tabs are tapered, and further they are angularly offset with respect to the flow streams. The tabs protrude at predetermined angles into the core flow stream. The angular orientation of the nozzle tabs of the present invention with respect to the exhaust flow stream minimizes any adverse impact to engine thrust. In the exemplary embodiment of the present invention, the angle of protrusion ($\beta$) or angular offset defined as the acute angle between the tab and the extension of the nozzle surface at the downstream end thereof, can range from zero to twenty degrees (20°). In the preferred embodiment, the angle of protrusion ($\beta$) into the exhaust flow stream is thirteen degrees (13°). The tapering and angling of the tabs minimizes adverse impact in terms of increased pressure drop caused by the presence of the tabs in the flow stream.

The length of the tabs and the tab angles of protrusion into the flow stream play an important role in minimizing thrust losses. While there could be any number of combinations of these two considerations, in order to minimize the effect on thrust, both the length and the angle of protrusion are minimized in the present invention. Referring to FIG. 4, the value (H) representing the protrusion of the tabs into the flow stream is approximately less than or equal to 0.006 of the diameter (D) of the nozzles. The length (L) of the tabs is approximately equal to 0.04 of the diameter (D) of the nozzles. Thus, the tabbed arrangement of the present invention minimally interferes with the performance of the engine. Only a relatively small portion of the exhaust flow stream is affected by the tabs of the present invention. In contrast, mixing devices of the prior art provided cross-stream mixing across substantially, if not the entire, flow stream. This mixing over the wide flow area would adversely affect thrust.

As set forth hereinabove, the purpose of the nozzle tabs in the present invention is to enhance mixing at the interface 50 between the engine core and fan flow streams. This interface mixing shortens the effective length of the jet plume thereby reducing noise generation in the nozzle. Each tab produces a pair of streamwise vortices (shown in FIG. 2) that rotate in opposite directions. Vortices are formed at the tapered sides 55 of the tabs. The tabs work by introducing a swirling motion at the interface of the two streams they are acting on. When tabs are disposed at the merging interface of two streams, flow spills along the edges from the inward (high pressure) side toward the outward (low pressure) side. This movement of flow around the edges of the tabs causes two counter-rotating vortices to form. These vortices enhance the exchange of momentum or pull into mixing engagement, the flow that naturally occurs at the interface of two streams of different velocities. Thus, the vortices at the tapered sides of the tabs of the present invention pull the interface flow between the core flow stream and fan flow stream into mixing engagement. The vortices cause the fan flow to penetrate or be drawn into the core flow.

Further, by using a trapezoidal tab, larger vortices are generated, as opposed to tabs having a triangular shape such as those known in the prior art. This geometry is advantageous as it creates two effects on the fluid flow. First, each counter-rotating vortex is of higher strength than those produced by prior art triangular tabs with the same penetration because of the truncated downstream edge of the tab of the present invention. This truncated edge causes a higher pressure differential between inner and outer surfaces, thereby increasing vortex strength. Secondly, since the two sides of the trapezoidal tab of the present invention do not meet at a point, and are separated by the width of the truncated end, the two counter-rotating vortices created are spaced a sufficient distance apart so that they can independently act on the fluid interface for a longer axial length before merging and losing strength. In addition, each tab is spaced apart from adjacent tabs along the perimeter of the nozzle by a distance ranging from 0.5–1.5 times the base width 60 of each tab. The spacing also causes the vortices to be spaced a sufficient distance apart so that the vortices can independently engage large volumes of interface flow which increases the rate of mixing between the two streams and reduces noise.

Thus, larger and stronger vortices in terms of larger volume at the interface between the core and fan flow streams, result due to the trapezoidal tabs having tapered sides. Effective mixing between the interface of the two flow streams decreases flow disturbances between the core flow and fan tow interfaces downstream of the mixing which results in attenuating jet noise.

The tabs of the jet noise suppressor of the present invention extract relatively little energy from the fluid stream compared to other fluid flow mixing devices of the prior art. Since the interface between the two engine streams occupies a very small radial region, the tabs as disclosed, need only be angled inwardly by a small amount. The high velocity of the two flow streams provide for adequate mixing at the interface of the separate flow streams even with small penetration of the tabs into the flow stream. Thus, the present invention minimizes the thrust loss of the engine.

While the formation of vortices as discussed heretofore is important to providing adequate mixing at the interface layers of the engine flow streams, vortices may adversely impact high frequency noise components. As described hereinabove, each tab is spaced apart from adjacent tabs on either side, with the spacing ranging between 0.5 to 1.5 times the base width of each tab. This spacing interrupts the formation of vortices along the entire circumference of the nozzle exit. Thus, mixing at the interface between the core flow stream and the fan stream is interrupted along the areas corresponding to the spaces between the tabs. While the phenomenon is not completely understood, it is believed that the interruption due to tab spacing in the mixing at the interface flow between the core and fan flow is significant because it results in the jet noise suppressor of the present invention not making a substantial contribution to the high frequency jet noise components.

The preferred embodiment disclosed the tabs being disposed only at the exit of the core nozzle. It will be understood by those skilled in the art that the jet noise suppressor of the present invention may have equal utility if disposed in engines having both a primary core and a secondary fan nozzle as well as in engines having only a primary core exhaust nozzle. For bypass engines, the tab arrangement of the present invention can be disposed either at the exit end of both the primary and secondary nozzles or at the exit end of either of the two nozzles. If disposed only on the fan nozzle, the tabs would facilitate the mixing at the interface of the fan flow and ambient.

The tabs have been described and illustrated as being generally trapezoidal in shape with certain geometric dimensions. It is to be understood by those skilled in the art that the above number and size of tabs described are derived for a particular exhaust nozzle size and geometry. A different number of and size of tabs may be utilized in light of the teachings herein to suit different nozzles.

Although the invention has been shown and described with respect to detailed embodiments thereof, it should be understood by those skilled in the art that various changes in form and detail thereof may be made without departing from the spirit and the scope of the claimed invention.

What is claimed is:

1. A jet noise suppressor in a gas turbine engine, the engine having a longitudinally extending central axis, and a nozzle having an associated diameter and a downstream end to discharge engine flow therefrom to the surrounding air, comprising:
    an arrangement of tabs disposed on the downstream end of the nozzle, directed and extending radially inwardly towards the engine flow and disposed circumferentially about the nozzle, each tab being uniformly spaced apart from an adjacent tab on either side thereof, each of the tabs having a major surface that is generally trapezoidal, decreasing in width in the downstream direction.

2. The jet noise suppressor of claim 1, wherein the tabs protrude into the engine flow at an angle of up to twenty degrees (20°).

3. The jet noise suppressor. of claim 2, wherein the preferred angle of protrusion into the engine flow is thirteen degrees (13°).

4. The jet noise suppressor of claim 1, wherein the tabs have sides that are tapered.

5. The jet noise suppressor of claim 4, wherein the taper angle of the sides of trapezoidal tabs ranges from an angle of five to fifteen degrees (5–15°).

6. The jet noise suppressor of claim 5, wherein the preferred taper angle of the sides of the trapezoidal tabs is ten degrees (10°).

7. The jet noise suppressor of claim 5, wherein the tabs have a length that is approximately equal to 0.04 times the diameter of the nozzle.

8. The jet noise suppressor of claim 2, wherein the amount of protrusion of the tabs directed radially inwardly is approximately less than or equal to 0.006 of the diameter of said nozzle.

9. A jet noise suppressor in a gas turbine engine, the engine having a longitudinally extending central axis, inner and outer flow paths for carrying inner and outer fluid flow streams through the engine, the outer flow path terminating at an outer nozzle having a diameter to discharge the outer flow stream to ambient, and the inner flow path terminating at an inner nozzle, located downstream of the outer nozzle, having a diameter to discharge the inner flow stream to ambient, at least one of the nozzles comprising:

an arrangement of tabs directed and extending radially inwardly towards the flow stream, the tabs disposed circumferentially about the nozzle, each tab spaced apart from an adjacent tab on either side thereof, each of the tabs having a major surface that is generally decreasing in width in the downstream direction.

10. The jet noise suppressor of claim 9, wherein the tabs directly radially inwardly protrude into the nozzle flow stream at an angle of up to twenty degrees (20°).

11. The jet noise suppressor of claim 10, wherein the preferred angle of protrusion into the engine flow is thirteen degrees (13°).

12. The jet noise suppressor of claim 9, wherein the tabs have sides that are tapered.

13. The jet noise suppressor of claim 12, wherein the taper angle of the sides of the tabs ranges from an angle of five to fifteen degrees (5–15°).

14. The jet noise suppressor of claim 12, wherein the preferred taper angle of the tabs is ten degrees (10°).

15. The jet noise suppressor of claim 12, wherein the tabs have a length that is approximately equal to 0.04 times the diameter of the nozzles.

16. The jet noise suppressor of claim 10, wherein the amount of protrusion of the tabs directed radially inwardly is approximately less than or equal to 0.006 of the diameter of said inner and outer nozzle.

17. The jet noise suppressor of claim 9, wherein each of said tabs has a downstream end that is truncated.

18. The jet noise suppressor of claim 17, wherein said tab has a trapezoidal shape.

19. A jet noise suppressor in a gas turbine engine, the engine having an external nozzle, an exhaust path through the external nozzle and a flow path around the external nozzle, the jet noise suppressor comprising an arrangement of tabs on the external nozzle, the tabs having a taper in a downstream direction and projecting a distance into the exhaust path sufficient to mix the exhaust path and the flow path but with minimal impact on engine thrust.

20. The jet noise suppressor as recited in claim 19, wherein the nozzle has a diameter (d) and the distance is up to approximately 0.006 d.

21. The jet noise suppressor as recited in claim 19, wherein the tabs are uniformly spaced around the nozzle.

22. The jet noise suppressor as recited in claim 21, wherein the tabs have a base width (w) and adjacent tabs are spaced apart between approximately 0.5 w and 1.5 w.

* * * * *